United States Patent [19]

Dunnavant et al.

[11] Patent Number: 5,516,859
[45] Date of Patent: May 14, 1996

[54] POLYURETHANE-FORMING NO-BAKE FOUNDRY BINDER SYSTEMS

[75] Inventors: William R. Dunnavant, Columbus; Ken K. Chang, Dublin; Robert B. Fechter, Worthington, all of Ohio

[73] Assignee: Ashland Inc., Columbus, Ohio

[21] Appl. No.: 156,573

[22] Filed: Nov. 23, 1993

[51] Int. Cl.$^6$ ............................. C08L 61/10; C08L 61/06
[52] U.S. Cl. ............... 525/504; 525/501; 523/142; 523/143; 264/331.19
[58] Field of Search .................... 525/501, 504; 523/143, 142; 264/331.19

[56] References Cited

U.S. PATENT DOCUMENTS

| | | | |
|---|---|---|---|
| 4,252,700 | 2/1981 | Funobiki et al. | 260/25 |
| 4,900,671 | 2/1990 | Pokora et al. | 435/156 |
| 4,992,372 | 2/1991 | Pokora et al. | 435/192 |
| 5,110,740 | 5/1992 | Pokora et al. | 435/262 |
| 5,112,752 | 5/1992 | Johnson et al. | 435/192 |
| 5,132,339 | 7/1992 | Carpenter et al. | 523/143 |
| 5,147,793 | 9/1992 | Johnson et al. | 435/156 |
| 5,151,488 | 9/1992 | Hutchings et al. | 528/179 |
| 5,153,298 | 10/1992 | Pokora et al. | 528/86 |
| 5,178,762 | 1/1993 | Pokora et al. | 210/632 |
| 5,424,376 | 6/1995 | Chang et al. | 525/480 |

*Primary Examiner*—W. Robinson H. Clark
*Attorney, Agent, or Firm*—David L. Hedden

[57] ABSTRACT

This invention relates to polyurethane-forming foundry no-bake binder systems comprising a phenolic resin component and polyisocyanate component. The phenolic resin component comprises a blend of (a) polyphenol resin and (b) a phenolic resole resin. The binder systems have reduced phenol and free formaldehyde due to the presence of the polyphenol resin in the phenolic resin component. Foundry shapes are made by the no-bake process and are used in making ferrous and non ferrous metal castings.

20 Claims, No Drawings

POLYURETHANE-FORMING NO-BAKE FOUNDRY BINDER SYSTEMS

FIELD OF THE INVENTION

This invention relates to polyurethane-forming foundry no-bake binder systems comprising a phenolic resin component, a polyisocyanate component, and a liquid amine curing catalyst. The phenolic resin component comprises a blend of (a) a polyphenol resin and (b) a phenolic resole resin. The binder systems have reduced phenol and free formaldehyde due to the presence of the polyphenol resin in the phenolic resin component. Foundry shapes are made by the no-bake process and are used in making ferrous and non ferrous metal castings.

BACKGROUND OF THE INVENTION

Recently, due to environmental concerns, there is an interest in developing foundry binders with lower amounts of free phenol and formaldehyde. U.S. Pat. Nos. 4,900,671 and 5,153,298 describe polyphenol resins which do not contain free phenol or formaldehyde. At column 7, lines 58 to column 8, line 4, U.S. Pat. No. 5,153,298 states that these resins are used as developer resins, adhesives, conductive polymers, antioxidants for plastics, rubber, for plasma resistance in photoresists, and molding materials for high temperature applications. The patents do not teach or suggest that these polyphenol resins can be used as polyurethane foundry binders. No-bake polyurethane foundry binders are used in foundry applications by mixing them with an aggregate, such as sand, and a liquid amine curing catalyst, and shaping the resulting foundry mix into a mold or core which can be used to cast metal parts.

SUMMARY OF THE INVENTION

This invention relates to no-bake polyurethane-forming foundry binder systems comprising as separate components:
(a) an organic polyisocyanate component;
(b) a phenolic resin component comprising a blend of a polyphenol resin wherein the benzene rings of said polyphenol resin are directly bonded to each other, and a phenolic resole resin; and
(c) a liquid amine curing catalyst.

The advantages of this invention over the prior art are as follows:

(1) Since the polyphenol resin does not have methylene bridges in the polymer, which are typically found in phenolic resole resins, the binder potentially has higher temperature resistance properties.

(2) The use of the polyphenol resin in the binder results in a binder with reduced amounts of free phenol and formaldehyde.

(3) When foundry shapes are made according to the no-bake process with polyurethane-forming binder from blends of the polyphenol resin with conventional phenolic resole resins and appropriate solvents, the foundry shapes show higher 24 hour tensile strengths than foundry shapes made with only conventional phenolic resole resins.

(4) Metal castings prepared with cores using binders containing blends of polyphenol resin and conventional phenolic resole resins show better penetration properties than those prepared with binders containing only conventional phenolic resole resins.

The foundry binder systems are mixed with a foundry aggregate to form foundry mixes which can be shaped into foundry shapes such as molds and/or cores and used in the casting of metal parts. They are used to make foundry shapes by the no-bake processes.

BEST MODE AND ENABLING DISCLOSURE

The phenolic resin component of the binder comprises a blend of a polyphenol resin and a conventional phenolic resole resin. The polyphenol resins which are used in this binder system are polyphenol resins wherein the benzene rings of the resin are directly bonded to each other. Preferred polyphenol resins are described in U.S. Pat. Nos. 4,900,671, 5,112,752 and 5,153,298 which are hereby incorporated by reference into this disclosure. They include substituted and unsubstituted polyphenol resins. Polyphenol resins are polymers having multiple phenolic rings the majority of which are bonded together by direct linkages rather than methylene, aliphatic ether, or other linkages.

The polyphenol resins are essentially made by reacting a phenol or a substituted phenol with a peroxidase or an oxidase enzyme and peroxide in an aqueous organic solvent-containing medium. The phenol or substituted phenol and organic solvent are present at a weight ratio greater than about 0.5:1.0.

Generally, typical phenols used to prepare the polyphenol resins may be represented by the following structural formula:

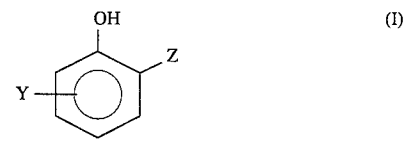

wherein Y and Z are selected from the group consisting of a hydrogen atom; halogen atom; an alkyl group; an alkoxy group; an aryl group; an allyl group; a —COOR group, where R represents a hydrogen atom, a lower alkyl group, or a phenylalkyl group; a —NR$^1$R$^2$ group where R$^1$ and R$^2$ are the same or different and represent a hydrogen atom, alkyl group, or a phenylalkyl group; or Z in conjunction with the adjacent meta position forms a condensed benzene ring which may be substituted or unsubstituted. Since polymerization proceeds via the ortho or para position, when Y is at the ortho or para position, at least one of Y and Z must be a hydrogen atom.

A single phenol or mixture of phenols may be used to make the polyphenol resins. Multiple ring phenols such as bisphenol A can also be used.

Specific examples of suitable phenols used to prepare the polyphenol resins include phenol, o-cresol, p-cresol, p-t-butylphenol, p-amylphenol, p-octylphenol, and p-nonylphenol.

The polyphenol resins are polyphenol resins wherein the the phenolic units of the resin are directly bonded to one another through positions ortho or para to the hydroxyl group. The preferred polyphenol resins have either of the following structural formulae:

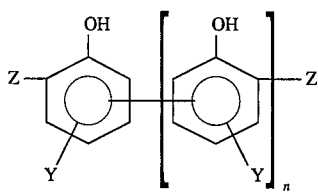

(II)

where (1) n is greater than 0, and (2) wherein Y and Z are selected from the group consisting of a hydrogen atom; halogen atom; an alkyl group; an alkoxy group; an aryl group; an allyl group; a —COOR group, where R represents a hydrogen atom, a lower alkyl group, or a phenylalkyl group; a —NR$^1$R$^2$ group where R$^1$ and R$^2$ are the same or different and represent a hydrogen atom, alkyl group, or a phenylalkyl group; or Z in conjunction with the adjacent meta position forms a condensed benzene ring which may be substituted or unsubstituted; or

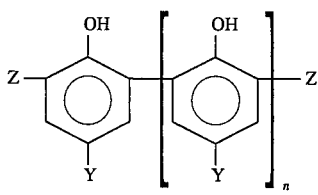

(III)

where n, Y, and Z are defined as in formula (II).

The polyphenol resins can be homopolymers or copolymers, i.e., the individual Y or Z groups may be the same or different and the Y groups may be located at different positions in accordance with formula (II).

The phenolic resin component also contains a phenolic resole resin which is prepared by reacting an excess of aldehyde with a phenol in the presence of either an alkaline catalyst or a divalent metal catalyst according to methods well known in the art. The preferred phenolic resins are specifically described in U.S. Pat. No. 3,485,797 which is hereby incorporated by reference. These resins are the reaction products of an aldehyde with a phenol. They contain a preponderance of bridges joining the phenolic nuclei of the polymer which are ortho-ortho benzylic ether bridges. They are prepared by reacting an aldehyde and a phenol in a mole ratio of aldehyde to phenol of at least 1:1 in the presence of a metal ion catalyst, preferably a divalent metal ion such as zinc, lead, manganese, copper, tin, magnesium, cobalt, calcium, and barium. For purposes of this patent application, these phenolic resole resins will be referred to as "ortho-ortho benzylic ether phenolic resole resins".

Alkoxy-modified phenolic resins may also be used as the phenolic resin. These phenolic resins are prepared in essentially the same way as the unmodified phenolic resins previously described except a lower alkyl alcohol is reacted with the phenol and aldehyde or reacted with an unmodified phenolic resin.

The weight ratio of the polyphenol resin to the phenolic resole resin in the resin component generally is from 1:10 to 10:1 weight percent, preferably from 1:10 to 4:10.

The organic polyisocyanate component of the binder system contains an organic polyisocyanate having a functionality of two or more, preferably 2 to 5. It may be aliphatic, cycloaliphatic, aromatic, or a hybrid polyisocyanate. Mixtures of such polyisocyanates may be used.

Representative examples of polyisocyanates which can be used are aliphatic polyisocyanates such as hexamethylene diisocyanate, alicyclic polyisocyanates such as 4,4'dicyclohexylmethane diisocyanate, and aromatic polyisocyanates such as 2,4 and 2,6-toluene diisocyanate, diphenylmethane diisocyanate, and dimethyl derivatives thereof. Other examples of suitable polyisocyanates are 1,5-naphthalene diisocyanate, triphenylmethane triisocyanate, xylylene diisocyanate, polymethylenepolyphenyl isocyanates, chlorophenylene-2,4-diisocyanate, and the like.

The polyisocyanates are used in sufficient concentrations to cause the curing of the phenolic resin when treated with the curing catalyst. In general, the isocyanate ratio of the polyisocyanate to the hydroxyl of the phenolic resin is from 1.25:1.00 to 1.00:1.25, preferably about 1.1:1.0 to about 1.0:1.1, most preferably about 1:1. Expressed as weight percent, the amount of polyisocyanate used is from 10 to 500 weight percent, preferably 20 to 300 weight percent, based on the weight of the phenolic resin.

The polyisocyanate is used in a liquid form. Solid or viscous polyisocyanate must be used in the form of organic solvent solutions.

Both the phenolic resin component and organic polyisocyanate component contain an organic solvent. Those skilled in the art will know how to select specific solvents for the phenolic resin component and the organic polyisocyanate component.

It is known that the difference in the polarity between the polyisocyanate and the phenolic resins restricts the choice of solvents in which both components are compatible. Such compatibility is necessary to achieve complete reaction and curing of the binder compositions of the present invention. Polar solvents of either the protic or aprotic type are good solvents for the phenolic resin, but are not as effective with the polyisocyanate.

The polar solvents should not be extremely polar such as to become incompatible with the aromatic solvent. Suitable polar solvents are generally those which have been classified in the art as coupling solvents and include furfural, furfuryl alcohol, Cellosolve acetate, butyl Cellosolve, butyl Carbitol, diacetone alcohol, and Texanol. Other polar solvents include liquid dialkyl esters such as dialkyl phthalate of the type disclosed in U.S. Pat. No. 3,905,934 and other dialkyl esters such as dimethyl glutarate.

Aromatic solvents, although compatible with the polyisocyanate, are less compatible with the phenolic resins. It is, therefore, preferred to employ combinations of solvents and particularly combinations of aromatic and polar solvents. Suitable aromatic solvents are benzene, toluene, xylene, ethylbenzene, and mixtures thereof. Preferred aromatic solvents are mixed solvents that have an aromatic content of at least 90% and a boiling point range of 138° C. to 232° C.

The organic solvents which are used in the phenolic resin component are aromatic solvents, esters, ethers, and alcohols, preferably mixtures of these solvents. Preferably used as the organic solvent for the phenolic resin component are mixtures of esters and aromatic solvents in a weight ratio of aromatic solvent to ester of from 3:1 to 1:1, preferably from 2.0:1.0 to 1.5:1.0. The phenolic resin component of the binder composition also contains at least one organic solvent in an amount such that the solvent is from 40 to 60 weight percent of total weight of the phenolic resin component.

The organic solvents which are used in the polysiocyanate component are generally aromatic and aliphatic solvents, preferably mixtures of these solvents. The amount of solvent used in the polyisocyanate component of the binder composition is from about 20 to 50 weight percent of total weight of the polyisocyanate component.

Drying oils, for example those disclosed in U.S. Pat. No. 4,268,425, may also be used in the polyisocyanate component. Drying oils may be synthetic or natural occurring and include glycerides of fatty acids which contain two or more double bonds whereby oxygen on exposure to air can be absorbed to give peroxides which catalyze the polymerization of the unsaturated portions.

Examples of some natural drying oils include soybean oil, sunflower oil, hemp oil, linseed oil, tung oil, oiticia oil, and fish oils, and dehydrated castor oil, as well as the various known modifications thereof (e.g., the heat bodied, air-blown, or oxygen-blow oils such as blown linseed oil and blown soybean oil). The above discussion concerning the oils is not intended to imply that such actually cure in the present system by air drying, but is intended to help define the drying oils.

Also, esters of ethylenically unsaturated fatty acids such as tall oil esters of polyhydric alcohols such as glycerine or pentaerythritol or monohydric alcohols such as methyl and ethyl alcohols can be employed as the drying oil. If desired, mixtures of drying oils can be employed.

The binder compositions are preferably made available as a three component system comprising the phenolic resin component, amine catalyst, and the polyisocyanate component in a separate package. In the no-bake process, the phenolic resin component and catalyst are first mixed with the sand and then the polyisocyanate component is added to form the molding mix. Methods of distributing the binder on the aggregate particles are well-known to those skilled in the art. The mix can, optionally, contain other ingredients such as iron oxide, ground flax fibers, wood cereals, pitch, refractory flours, and the like.

An optional additive to the binder compositions of the present invention in certain types of sand is a silane which improves the humidity resistance of the system. The silanes are used in concentrations of 0.1% to 2%, based on the phenolic resin component.

Examples of some commercially available silanes are Dow Corning Z6040 and Union Carbide A-187 (gamma glycidoxy propyltrimethoxy silane); Union Carbide A-1100 (gamma aminopropyltriethoxy silane); Union Carbide A-1120 (N-beta(aminoethyl)-gamma-amino-propyltrimethoxy silane); and Union Carbide A-1160 (Ureido-silane).

When preparing an ordinary sand-type foundry shape, the aggregate employed has a particle size large enough to provide sufficient porosity in the foundry shape to permit escape of volatiles from the shape during the casting operation. The term "ordinary sand-type foundry shapes," as used herein, refers to foundry shapes which have sufficient porosity to permit escape of volatiles from it during the casting operation.

Generally, at least about 80% and preferably about 90% by weight of aggregate employed for foundry shapes has an average particle size no smaller than about 0.1 mm. The aggregate for foundry shapes preferably has an average particle size between about 0.1 mm and about 0.25 mm. The preferred aggregate employed for ordinary foundry shapes is silica wherein at least about 70 weight percent and preferably at least about 85 weight percent of the sand is silica. Other suitable aggregate materials include zircon, olivine, aluminosilicate, sand, chromite sand, and the like.

In molding compositions, the aggregate constitutes the major constituent and the binder constitutes a relatively minor amount. In ordinary sand type foundry applications, the amount of binder is generally no greater than about 10% by weight and frequently within the range of about 0.5% to about 7% by weight based upon the weight of the aggregate. Most often, the binder content ranges from about 0.6% to about 5% by weight based upon the weight of the aggregate in ordinary sand-type foundry shapes.

Although the aggregate employed is preferably dry, moisture of up to about 1 weight percent based on the weight of the sand can be tolerated. This is particularly true if the solvent employs is non-water-miscible or if an excess of the polyisocyanate necessary for curing is employed since such excess polyisocyanate will react with the water.

The foundry mix containing the liquid catalyst is molded into the desired shape and allowed to cure. Preferably used as the curing catalyst is a basic liquid amine catalyst having a $pK_b$ value in the range of about 7 to about 11. The $pK_b$ value is the negative logarithm of the dissociation constant of the base and is a well-known measure of the basicity of a basic material. The higher this number is, the weaker the base. The bases falling within this range are generally organic compounds containing one or more nitrogen atoms. Preferred materials are heterocyclic compounds containing at least one nitrogen atom in the ring structure. Specific examples of bases which have $pK_b$ values within the necessary range include 4-alkyl pyridines wherein the alkyl group has from one to four carbon atoms, isoquinoline, arylpyridines such as phenyl pyridine, pyridine, acridine, 2-methoxypyridine, pyridazine, 3-chloro pyridine, quinoline, N-vinylimidazole, N-methylimidazole, 4,4-dipyridine, phenylpropyl pyridine, 1-methylbenzimidazole, N-ethylimidazole, and 1,4-thiazine. Preferably used are imidazoles such as N-vinyl-, N-methyl- or N-ethylimidazole.

In view of the varying catalytic activity and varying catalytic effect desired, catalyst concentrations will vary widely. In general the lower the $pK_b$ value is, the shorter will be the bench life of the composition and the faster, more complete will be the cure. Solvents and any acidity present in added ingredients such as sand may affect the catalytic activity. In general, however, catalyst concentrations will range from 0.01 to 10 percent by weight of the phenolic resin.

EXAMPLES

The examples which follow will illustrate specific embodiments of the invention. These examples along with the written description will enable one skilled in the art to practice the invention. It is contemplated that many equivalent embodiments of the invention will be operable besides these specifically disclosed. The examples relate to the no-bake process for making foundry shapes except for Comparative Examples C, D, and E which relate to the cold-box process.

In these examples the no-bake process is carried out by mixing the liquid amine curing catalyst with the phenolic resin component and applying it to the aggregate. Then the polyisocyanate component is mixed with the mixture containing the phenolic resin component and catalyst. After completion of the mixing, the resulting foundry mix is placed in a pattern to where it cures to form a mold.

All parts are by weight and all temperatures are in degrees centigrade unless otherwise specified. The following abbreviations are used in the examples:

AN3N=PANASOL aromatic 400 solvent sold by AMOCO bos=based on sand boi=based on isocyanate component DBE=dibasic ester HS-10=HI-SOL 10, aromatic solvent 100 sold by Ashland Chemical Company HS-15=HI-SOL 15, aromatic solvent 150 sold by Ashland Chemical Company Imm.=immediate, used in connection with tensile strengths made immediately after shaping the shaping the foundry mix into a test sample KEX=kerosene MPCP=monophenyl chlorophosphate MR-200=a polymethylene polyphenyl isocyanate having a viscosity of about 2000 cps and sold by Miles, Inc. under the trademark MONDUR® 200

MRS-5=a polymethylene polyphenyl isocyanate having a viscosity of about 50 cps and sold by Miles, Inc. under the trademark MONDUR MRS-5

NVI=n-vinyl imidazole catalyst pbw=parts by weight

PPR=polyphenol resin substantially prepared as in Example 7 according to U.S. Pat. No. 5,153,298

PR=a polybenzylic ether phenolic resin prepared with zinc acetate dihydrate as the catalyst and modified with the addition of 0.09 mole of methanol per mole of phenol substantially in accordance with the procedure set forth in U.S. Pat. No. 3,485,797

PRC=phenolic resin component comprising PPR and PR

PTBP=p-t-butylphenol

Preparation of Polyphenol Resin (PPR).

In the Examples, the polyphenol resin (PPR) used was a substituted PPR, based on p-t-butylphenol (PTBP). The PPR was prepared according to a procedure similar to Example 14 of U.S. Pat. No. 5,112,752.

A five neck reaction flask equipped with temperature controller, addition funnel, stirrer, and condenser was first charged with 76.95 parts of ethanol, 209 parts of PTBP. The mixture was heated to 55° C. Water (153.3 parts) was then added to the reactor and the solution turned into an emulsion. Then, 104 parts of soybean hulls, which were ground and screened through a 30 mesh screen were added to the reactor. To reduce the viscosity of the reactants, an additional 66 parts of ethanol and 132 parts of water were added to the reactor. A 50% solution of hydrogen peroxide (60.75 parts) was slowly added to the reactor with agitation through the addition funnel in one hour. The temperature was kept between 55° C. to 65° C.

At the end of the reaction, agitation was stopped, the reaction mixture was cooled to room temperature, and the finished product settled at the bottom of the reactor. The top layer, which contained water and alcohol, was separated from the bottom layer, which contained the polymer and soybean hulls, by centrifugation. Water (350 parts) was added to the mixture to aid the centrifugation process.

The mixture of polymer and soybean hulls was then air dried on aluminum foil. The solid mixture was then extracted with one liter of ethylacetate to separate the polymer from soybean hulls. The mixture was centrifuged and the supernatant layer was filtered using a GF/F glass fiber filter. The soybean hulls were removed as a solid. The filtrate was then stripped of ethyl acetate using a rotary evaporator. The polymer was further purified by vacuum stripping with a vacuum pump at 96° C. at 0.3 mm Hg pressure for 2 hours. A total of 140 parts of PPR was obtained.

EXAMPLES 1–5

In Examples 1–5, the procedure for making the test foundry shapes was the same unless otherwise indicated. In these examples, the PPR was blended with a phenolic resin (PR) at a PPP/PR weight ratio with solvents as specified in Table I and II. The blend was mixed with n-vinylimidazole catalyst and then mixed with Wedron 540 sand. The isocyanate component was then added and mixed to form a foundry mix which was shaped into dogbone cores. The amount of binder used was 1.2 weight percent bos. The tensile strength properties are shown in Tables I and II. Measuring the tensile strength of the dog bone shapes enables one to predict how the mixture of sand and binder will work in actual foundry operations. The primary difference between the examples in Tables I and II is the dilution of the catalyst. In the examples of Table I, a 30% solution of n-vinylimidazole in HS-10 was used as the catalyst while concentrated n-vinylimidazole was used while in the examples of Table II.

TABLE I (Tensile strengths of test samples made using PPR with dilute NVI catalyst)

| Example | A | 1 | 2 | 3 | 3 |
|---|---|---|---|---|---|
| Resin Component | Amount (pbw) | | | | |
| PR | 60.0 | 54.0 | 48.0 | 42.0 | 42.0 |
| PPR | 0 | 6.0 | 12.0 | 18.0 | 18.0 |
| HS-15 | 22.4 | 22.4 | 22.4 | 22.4 | 22.4 |
| DBE | 17.5 | 17.5 | 17.5 | 17.5 | 17.5 |
| Isocyanate Component | Amount (pbw) | | | | |
| MR-200 | 73.0 | 69.4 | 66.6 | 63.7 | 63.7 |
| KEX | 3.0 | 3.4 | 3.7 | 4.0 | 4.0 |
| HI-15 | 24.0 | 27.2 | 29.7 | 32.3 | 32.3 |
| Catalyst (30% NVI) | 3.2 | 3.9 | 4.6 | 4.6 | 5.3 |
| WT/ST | 4.5/5.5 | 4.25/5.0 | 4.5/5.5 | 5.75/7.5 | 4.75/6.0 |
| TIME | TENSILE STRENGTHS OF CORES | | | | |
| 1 hr. | 161 | 203 | 182 | 142 | 121 |
| 3 hr. | 193 | 191 | 216 | 199 | 145 |
| 24 hr. | 252 | 283 | 288 | 272 | 264 |
| 24 hr. @ 100% RH | 61 | 52 | 45 | 41 | 36 |

Table I shows that long term tensile strengths measured 24 hours after mixing are improved by the addition of PPR to the resin component of the polyurethane no-bake binder when a dilute solution of n-vinylimidazole is used as the catalyst. Note particularly Examples 2–3 where the catalyst level is kept constant and the work time and strip time varied, the 24 hour tensile strengths of the test shapes were still improved in both cases.

TABLE II (Tensile strengths of test samples made using PPR with concentrated NVI catalyst)

| Example | B | 5 | 6 |
|---|---|---|---|
| Resin Component | Amount (pbw) | | |
| PR | 60.0 | 54.0 | 48.0 |
| PPR | 0 | 6.0 | 12.0 |
| HS-15 | 22.4 | 22.4 | 22.4 |
| DBE | 17.5 | 17.5 | 17.5 |
| Isocyanate Component | Amount (pbw) | | |

TABLE II-continued (Tensile strengths of test samples made using PPR with concentrated NVI catalyst)

| Example | B | 5 | 6 |
|---|---|---|---|
| MR-200 | 73.0 | 69.4 | 66.6 |
| KEX | 3.0 | 3.4 | 3.7 |
| HS-15 | 24.0 | 27.2 | 29.7 |
| Catalyst (NVI) | 0.8 | 1.0 | 1.2 |
| WT/ST (minutes) | 5.00/ 6.25 | 5.00/ 6.25 | 4.75/ 6.25 |
| TIME | TENSILE STRENGTHS OF CORES | | |
| 1 hr. | 197 | 190 | 191 |
| 3 hr. | 203 | 243 | 219 |
| 24 hr. | 255 | 325 | 339 |
| 4 hr. @ 100% RH | 65 | 63 | 42 |

Table II shows that the tensile strengths measured 3 hours and 24 hours after mixing are improved by the addition of polyphenol to the resin component of the polyurethane no-bake binder. This is important because many foundry shapes are not used for hours after they are made, and then are subjected to handling and transportation conditions which require that shapes have maximum strength to prevent damage to them.

Comparison examples C, D, and E in Table III show tensile strengths of test samples made with PPR in the binder. In these examples the test samples were made by a cold-box process. The sand mixes were prepared as in Examples 1–6, except that no catalyst was blended with the PRC.

In all of the examples the test specimens were produced by the cold-box process by contacting the compacted mixes with triethylamine (TEA) for 1 second. All parts are by weight and all temperatures are in ° C. unless otherwise specified. The amount of binder used in these examples was 1.3% bos.

The composition of the PRC used in the examples is shown in Table III. The PRC also contained a silane (A-187 sold by Union Carbide) in the amount of 0.8 part and a release agent (Sylfat 95 sold by Arizona Chemical) in an amount of 0.8 part, said parts based upon the total weight of the resin component.

The polyisocyanate component used in the examples comprised MRS-5 and a mixture of aliphatic and aromatic solvents in the weight ratio specified in Table III. A bench life extender, MPCP (0.80 part boi), was added to the polyisocyanate component as well as POLYSOL 15 (3.60 parts boi), a 50% solution of polymerized linseed oil dissolved in HS-15.

The resulting foundry mixes were compacted into a dogbone shaped core box by blowing and were cured using the cold-box process as described in U.S. Pat. No. 3,409,579. In this instance, the compacted mixes were then contacted with a mixture of TEA in nitrogen at 20 psi for 1 second, followed by purging with nitrogen that was at 60 psi for about 6 seconds, thereby forming AFS tensile test specimens (dog bones) using the standard procedure.

In the examples which follow, the sand mixes were cured at zero hours bench time, at ambient conditions, and the tensile strengths were measured immediately and 24 hours after curing. The results are given in Table III.

TABLE III (COMPARISON: USE OF PPR IN COLD-BOX PROCESS)

| Example | C | D | E |
|---|---|---|---|
| Resin Component | Amount (pbw) | | |
| PR | 55.0 | 45.0 | 35.0 |
| PPR | 0 | 6.0 | 12.0 |
| AN3N | 13.5 | 13.5 | 13.5 |
| DBE | 14.0 | 14.0 | 14.0 |
| DOA | 9.4 | 9.4 | 9.4 |
| HS-10 | 6.5 | 6.5 | 6.5 |
| Isocyanate Component | Amount (pbw) | | |
| MRS | 73.3 | 67.4 | 61.6 |
| HS-10 | 7.8 | 10.1 | 12.4 |
| HS-15 | 5.2 | 6.7 | 8.2 |
| AN3N | 7.0 | 9.1 | 11.1 |
| KEX | 2.3 | 2.3 | 2.30 |
| TIME | TENSILE STRENGTHS OF CORES | | |
| Imm. | 115 | 72 | 49 |
| 1 hr. | 148 | 110 | 79 |
| 24 hr. | 186 | 151 | 129 |
| 24 hr. @ 100% RH | 64 | 66 | 61 |

In contrast to the data in Tables I and II which show that the addition of the polyphenol to the resin component of the polyurethane no-bake binder causes the tensile strengths of the test samples to improve, the data in Table III indicate that the addition of the polyphenol to the resin component of the polyurethane cold-box binder cause the tensile strengths of the test samples to be degraded. These results were also confirmed on test samples made from a foundry mix which had set for several hours.

We claim:

1. A polyurethane-forming no-bake binder system comprising as separate components:
   (a) polyisocyanate component;
   (b) a phenolic resin component comprising a blend of
      (1) a polyphenol resin wherein the phenolic units of the resin are directly bonded to one another through positions ortho or para to the hydroxyl group, and
      (2) a phenolic resole resin; and
   (c) a liquid amine curing catalyst.

2. The binder composition of claim 1 wherein the phenolic resole resin is a benzylic ether phenolic resole resin and polyphenol resin is a polyphenol resin having the following structural formula:

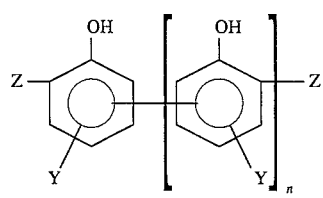

wherein (1) n is greater than 0, and (2) wherein Y and Z are selected from the group consisting of a hydrogen atom; halogen atom; an alkyl group; an alkoxy group; an aryl group; an allyl group; a —COOR group, where R represents a hydrogen atom, a lower alkyl group, or a phenylalkyl group; a —NR$^1$R$^2$ group where R$^1$ and R$^2$ are the same or different and represent a hydrogen atom, alkyl group, or a phenylalkyl group; or Z in conjunction with the adjacent meta position forms a condensed benzene ring which may be substituted or unsubstituted.

3. The binder composition of claim 2 wherein the ratio of polyphenol resin to phenolic resole resin in the phenolic resin component is from 1:10 to 4:10.

4. The polyurethane-forming binder system of claim 3 wherein the polyphenol resin is based upon p-t-butyl-phenol.

5. The polyurethane-forming binder composition of claim 4 wherein the ratio of hydroxyl groups of the phenolic resin component to the isocyanate groups of the polyisocyanate component is from 1.25:1.00 to 1.00:1.25.

6. The polyurethane-forming binder composition of claim 5 wherein the phenolic resin component contains a solvent in which the polyphenol resin and phenolic resole resin are soluble, and wherein the polyisocyanate component contains a solvent in which the polyisocyanate is soluble.

7. A foundry mix composition which comprises in admixture:
 (a) a major amount of aggregate; and
 (b) an effective bonding amount of a polyurethane-forming binder comprising in admixture with the aggregate:
  (1) polyisocyanate component;
  (2) a component comprising a blend of a polyphenol resin wherein the benzene rings of the resin are directly bonded to each other, and a phenolic resole resin; and
  (3) a liquid amine curing catalyst.

8. The foundry mix of claim 7 wherein the binder composition is about 0.6 to 5.0 weight percent based upon the weight of the aggregate.

9. The foundry mix claim 8 wherein the phenolic resole resin is a benzylic ether phenolic resole resin and the polyphenol resins are polyphenol resins are selected from the group consisting of polyphenol resins having either of the following structural formulae:

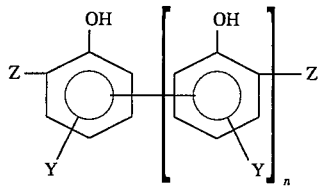

wherein (1) n is greater than 0, and (2) wherein Y and Z are selected from the group consisting of a hydrogen atom; halogen atom; an alkyl group; an alkoxy group; an aryl group; an allyl group; a —COOR group, where R represents a hydrogen atom, a lower alkyl group, or a phenylalkyl group; a —NR$^1$R$^2$ group where R$^1$ and R$^2$ are the same or different and represent a hydrogen atom, alkyl group, or a phenylalkyl group; or Z in conjunction with the adjacent meta position forms a condensed benzene ring which may be substituted or unsubstituted.

10. The binder composition of claim 9 wherein the ratio of polyphenol resin to phenolic resole resin in the phenolic resin component is from 1:10 to 1:4.

11. The polyurethane-forming binder system of claim 10 wherein the polyphenol resin is derived from p-t-butylphenol.

12. The polyurethane-forming binder composition of claim 11 wherein the ratio of hydroxyl groups of the phenolic resin to the isocyanate groups of the polyisocyanate hardener is from 1.25:1.00 to 1.00:1.25.

13. The polyurethane-forming binder composition of claim 12 wherein the phenolic resin component contains a solvent in which the polyphenol resin and phenolic resole resin are soluble, and wherein the polyisocyanate component contains a solvent in which the polyisocyanate is soluble.

14. A no-bake process for preparing a foundry shape which comprises:
 (a) mixing a foundry aggregate with a bonding amount of up to about 10% by weight, based upon the weight of the aggregate, of a polyurethane-forming binder comprising in admixture with the aggregate:
  (1) polyisocyanate component;
  (2) a phenolic resin component comprising a blend of a polyphenol resin wherein the benzene rings of the resin are directly bonded to each other, and a phenolic resole resin; and
  (3) a liquid amine curing catalyst;
 (b) introducing the foundry mix obtained from step (a) into a pattern;
 (c) hardening the foundry mix in the pattern to become self-supporting; and
 (d) thereafter removing the shaped foundry mix of step (c) from the pattern and allowing it to further cure, thereby obtaining a hard, solid, cured foundry shape.

15. The process of claim 14 wherein the binder composition is about 0.6 to 5.0 weight percent based upon the weight of the aggregate.

16. The process of claim 15 wherein the phenolic resole resin is a benzylic ether and the polyphenol resin is a polyphenol resin selected from the group consisting of polyphenol resins having either of the following structural formulae:

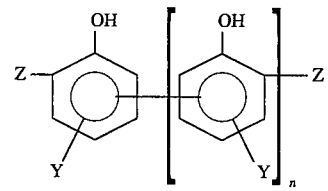

wherein (1) n is greater than 0, and (2) wherein Y and Z are selected from the group consisting of a hydrogen atom; halogen atom; an alkyl group; an alkoxy group; an aryl group; an allyl group; a —COOR group, where R represents a hydrogen atom, a lower alkyl group, or a phenylalkyl group; a —NR$^1$R$^2$ group where R$^1$ and R$^2$ are the same or different and represent a hydrogen atom, alkyl group, or a phenylalkyl group; or Z in conjunction with the adjacent meta position forms a condensed benzene ring which may be substituted or unsubstituted.

17. The process of claim 16 wherein the ratio of polyphenol resin to phenolic resole resin in the phenolic resin component is from 1:10 to 4:10.

18. The process of claim 17 wherein the polyphenol resin is derived from p-t-butyl phenol.

19. The process of claim 18 wherein the ratio of hydroxyl groups of the phenolic resin to the isocyanate groups of the polyisocyanate hardener is from 1.25: 1.00 to 1.00:1.25.

20. The process of claim 19 wherein the phenolic resin component contains a solvent in which the polyphenol resin and phenolic resole resin are soluble, and wherein the polyisocyanate component contains a solvent in which the polyisocyanate is soluble.

* * * * *